United States Patent
Hong et al.

(10) Patent No.: US 12,239,931 B2
(45) Date of Patent: Mar. 4, 2025

(54) FOREIGN SUBSTANCE CAPTURE APPARATUS AND FACILITY FOR MANUFACTURING ELECTRICAL STEEL SHEET INCLUDING SAME

(71) Applicant: POSCO, Pohang-si (KR)

(72) Inventors: Seong-Cheol Hong, Pohang-si (KR);
Ki-Young Min, Pohang-si (KR);
Dong-Geun Kim, Pohang-si (KR);
Oho-Cheal Kwon, Pohang-si (KR);
Chang-Ho Kim, Pohang-si (KR)

(73) Assignee: POSCO, Pohang-si (KR)

( * ) Notice: Subject to any disclaimer, the term of this patent is extended or adjusted under 35 U.S.C. 154(b) by 382 days.

(21) Appl. No.: 17/777,471

(22) PCT Filed: Nov. 17, 2020

(86) PCT No.: PCT/KR2020/016149
§ 371 (c)(1),
(2) Date: May 17, 2022

(87) PCT Pub. No.: WO2021/101206
PCT Pub. Date: May 27, 2021

(65) Prior Publication Data
US 2023/0027665 A1  Jan. 26, 2023

(30) Foreign Application Priority Data
Nov. 18, 2019 (KR) .................. 10-2019-0147864

(51) Int. Cl.
*B01D 46/00* (2022.01)
*B03C 1/28* (2006.01)
(Continued)

(52) U.S. Cl.
CPC .......... *B01D 46/0034* (2013.01); *B03C 1/284* (2013.01); *B03C 1/286* (2013.01);
(Continued)

(58) Field of Classification Search
CPC .................................................. B01D 46/0034
See application file for complete search history.

(56) References Cited

U.S. PATENT DOCUMENTS 6,077,333 A  6/2000 Wolfs
8,636,907 B1  1/2014 Lin et al.
(Continued)

FOREIGN PATENT DOCUMENTS

CN  107921441 A  4/2018
CN  108699618 A  10/2018
(Continued)

OTHER PUBLICATIONS

Chinese Office Action dated Apr. 8, 2023 issued in Chinese Patent Application No. 202080079947.X.
(Continued)

*Primary Examiner* — Robert A Hopkins
(74) *Attorney, Agent, or Firm* — Morgan, Lewis & Bockius LLP

(57) ABSTRACT

A foreign substance capturing apparatus according to an embodiment of the present invention may comprise: a capturing body unit having an inlet port for introducing the air including magnetic foreign substances and an outlet port for discharging the air from which the magnetic foreign substances have been removed; and a magnetic isolation unit connected to the capturing body unit, including a magnetic member for isolating, by an attractive force, the magnetic foreign substances from the air flowing in the capturing body unit, and provided with a nonmagnetic member surrounding the magnetic member.

9 Claims, 7 Drawing Sheets

(51) Int. Cl.
  *B23K 26/08* (2014.01)
  *B23K 26/12* (2014.01)
  *B23K 26/16* (2006.01)
  *B23K 101/18* (2006.01)
  *B23K 103/04* (2006.01)

(52) U.S. Cl.
  CPC ........ *B23K 26/0838* (2013.01); *B23K 26/127* (2013.01); *B23K 26/16* (2013.01); *B03C 2201/20* (2013.01); *B03C 2201/28* (2013.01); *B23K 2101/18* (2018.08); *B23K 2103/04* (2018.08)

(56) References Cited

U.S. PATENT DOCUMENTS

| | | |
|---|---|---|
| 9,352,331 B1 | 5/2016 | Lee et al. |
| 2018/0311680 A1 | 11/2018 | Hanai et al. |
| 2019/0054570 A1 | 2/2019 | Hong et al. |
| 2019/0201913 A1 | 7/2019 | Wolfs et al. |

FOREIGN PATENT DOCUMENTS

| | | | |
|---|---|---|---|
| CN | 109843444 A | 6/2019 | |
| CN | 110201792 A | 9/2019 | |
| EP | 3406743 A1 | 11/2018 | |
| JP | H11-514292 A | 12/1999 | |
| JP | 2012-240019 A | 12/2012 | |
| JP | 2017-159206 A | 9/2017 | |
| JP | 2018-534121 A | 11/2018 | |
| JP | 2019-511629 A | 4/2019 | |
| KR | 20-1996-0010074 U | 4/1996 | |
| KR | 960010074 U | 4/1996 | |
| KR | 20-0259782 Y1 | 1/2002 | |
| KR | 10-2007-0098967 A | 10/2007 | |
| KR | 10-2013-0128187 A | 11/2013 | |
| KR | 10-2017-0011860 A | 2/2017 | |
| KR | 20170011860 A | * 2/2017 | |
| KR | 10-1739870 B1 | 5/2017 | |
| KR | 10-1906495 B1 | 10/2018 | |
| KR | 10-1988792 B1 | 9/2019 | |
| TW | 201511836 A | 4/2015 | |
| WO | 97/14502 A1 | 4/1997 | |
| WO | 2018/065779 A1 | 4/2018 | |

OTHER PUBLICATIONS

Japanese Office Action dated May 30, 2023 issued in Japanese Patent Application No. 2022-528716.
International Search Report dated Apr. 19, 2021 issued in International Patent Application No. PCT/KR2020/016149 (with English translation).
Extended European Search Report dated Dec. 14, 2022 issued in European Patent Application No. 20888835.4.
Indian Office Action dated Jan. 23, 2023 issued in Indiana Patent Application No. 202217031688 (with English translation).
Japanese Office Action dated Oct. 31, 2023 issued in Japanese Patent Application No. 2022-528716.

* cited by examiner

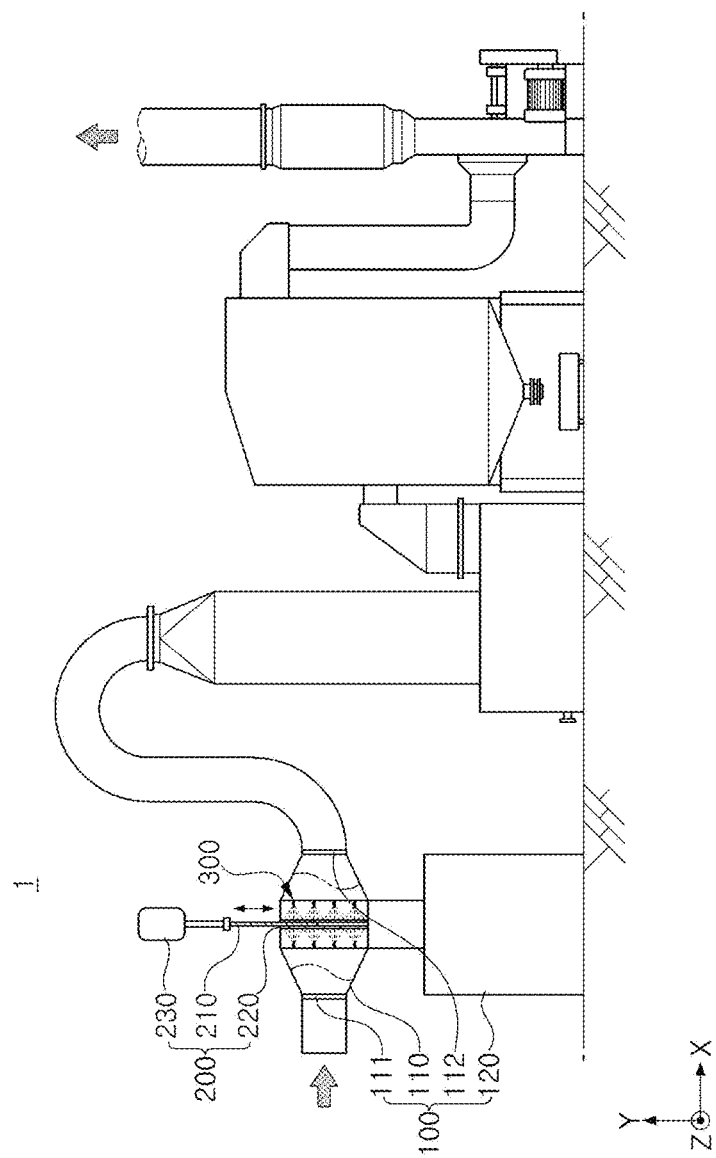
[FIG. 1]

[FIG. 2]
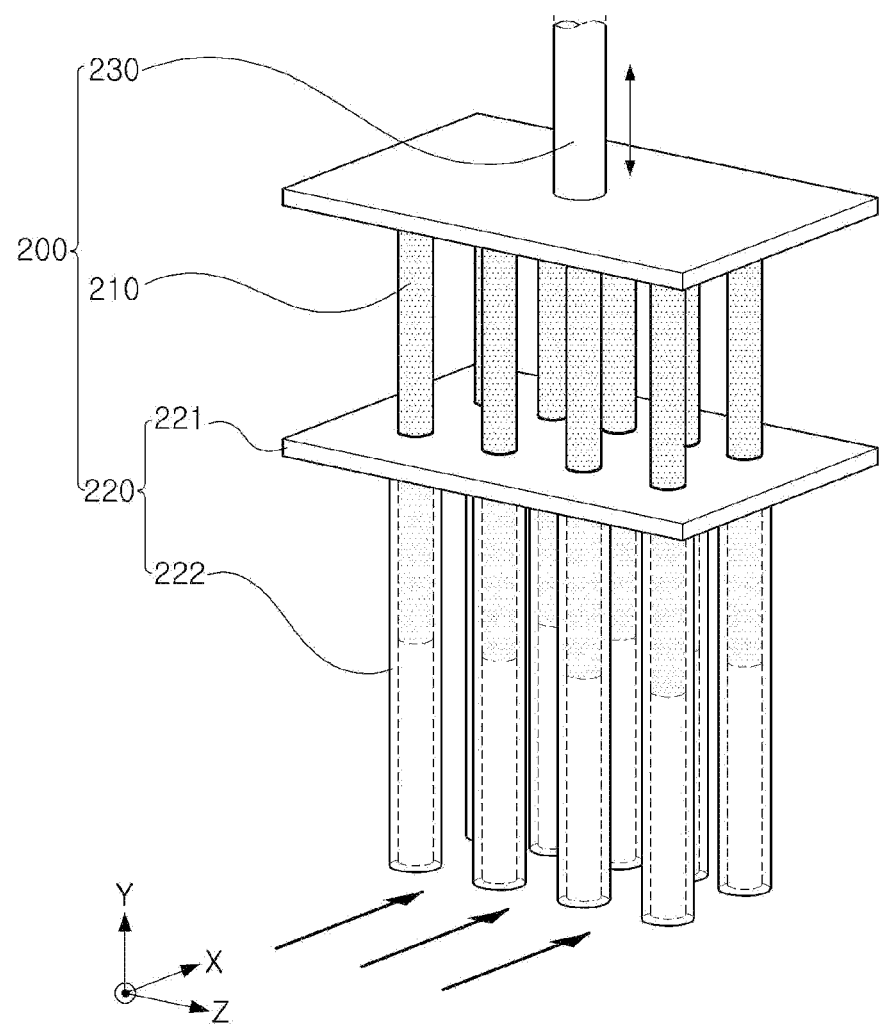

【FIG. 3】
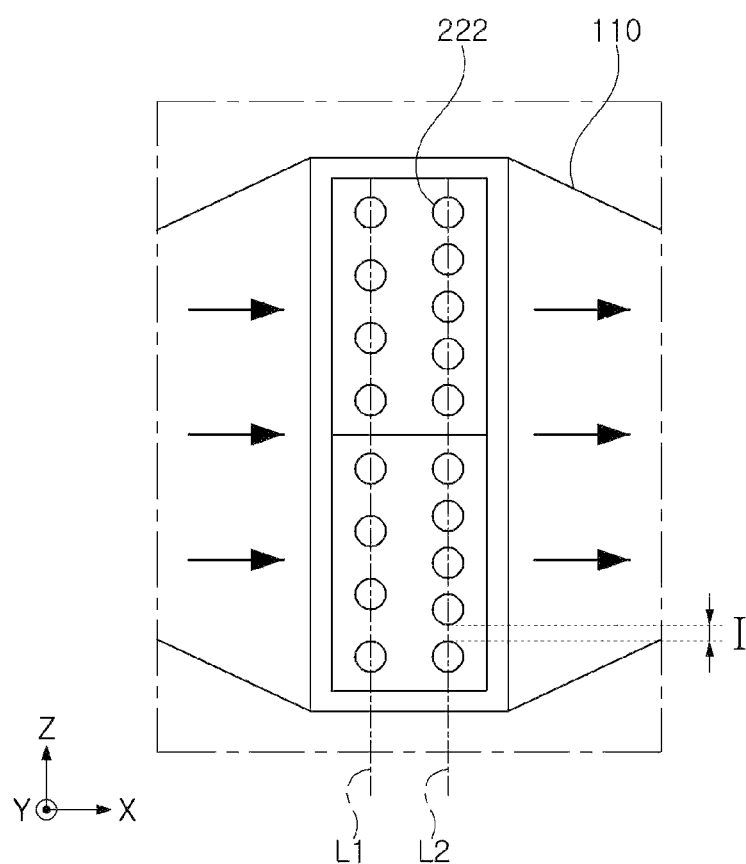

[FIG. 4]
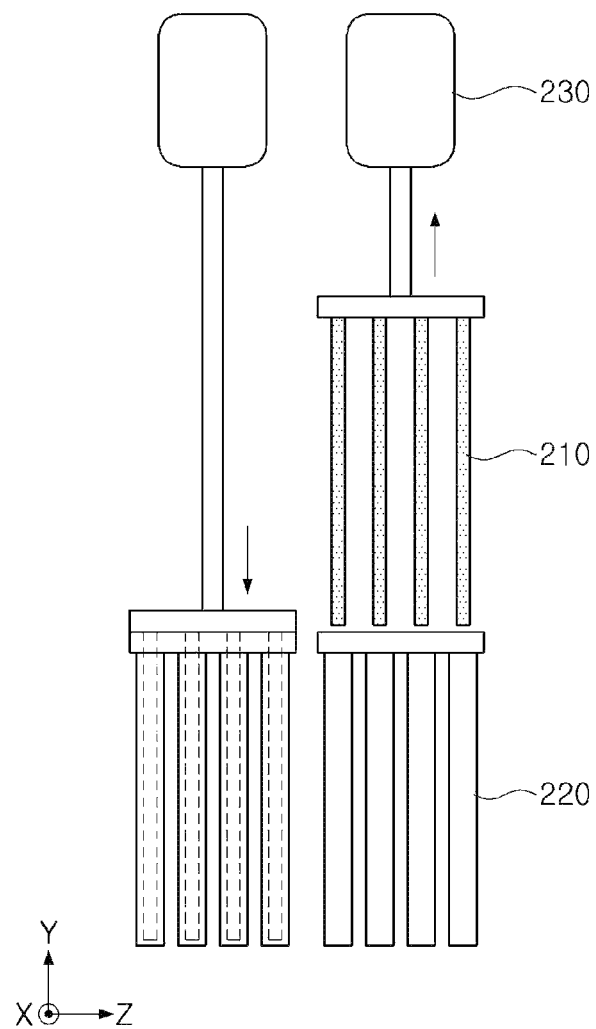

【FIG. 5】
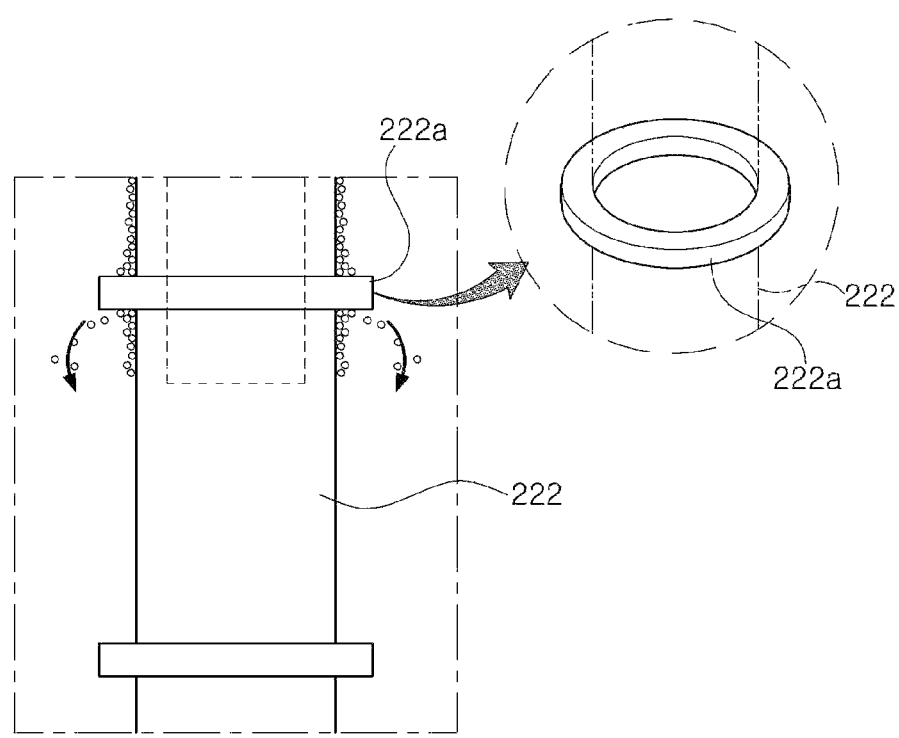

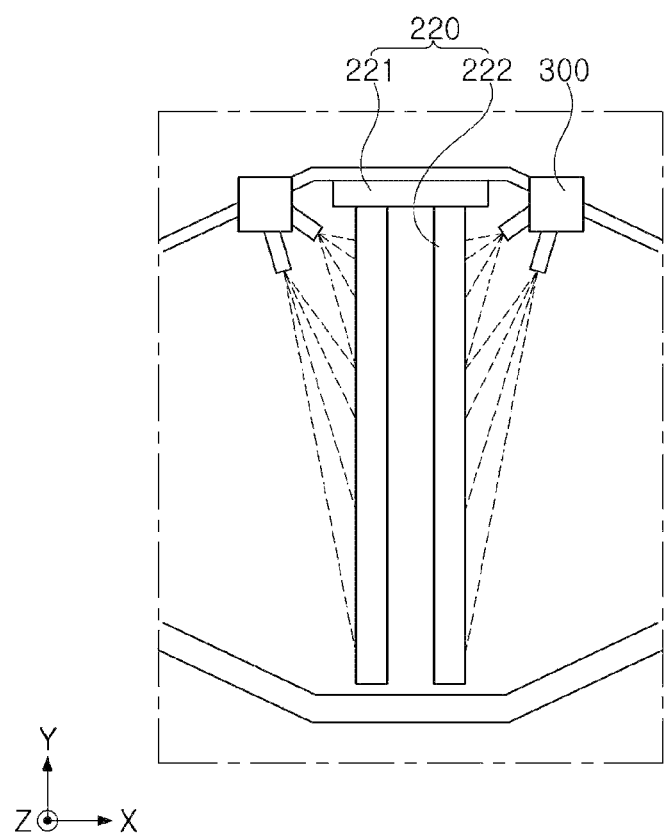
[FIG. 6]

[FIG. 7]
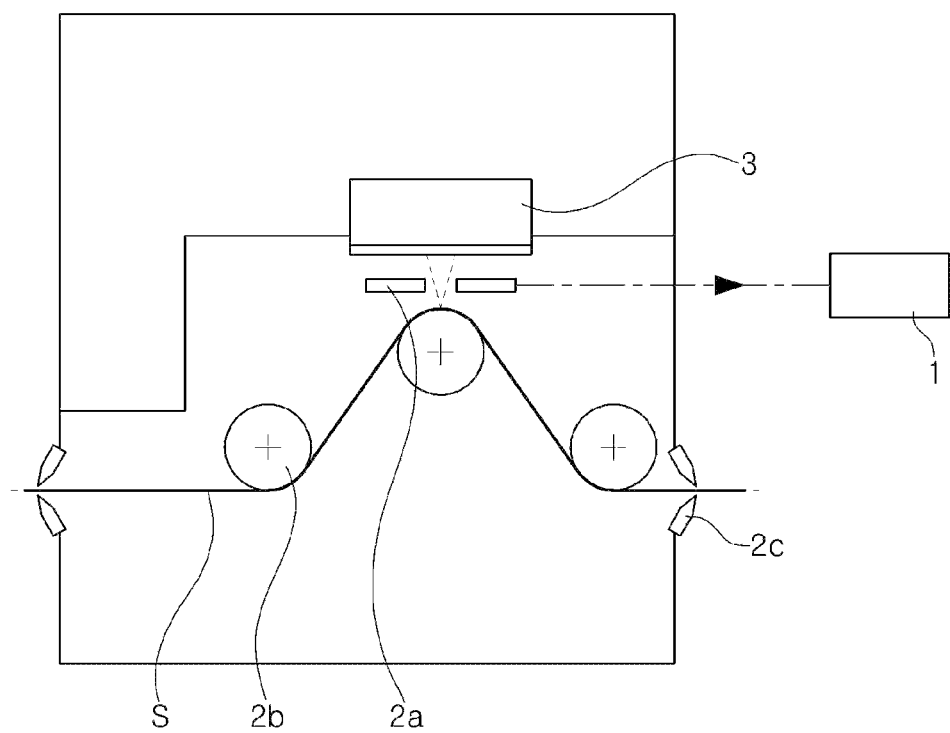

FOREIGN SUBSTANCE CAPTURE APPARATUS AND FACILITY FOR MANUFACTURING ELECTRICAL STEEL SHEET INCLUDING SAME

CROSS-REFERENCE OF RELATED APPLICATIONS

This application is the U.S. National Phase under 35 U.S.C. § 371 of International Patent Application No. PCT/KR2020/016149, filed on Nov. 17, 2020, which in turn claims the benefit of Korean Application No. 10-2019-0147864, filed on Nov. 18, 2019, the entire disclosures of which applications are incorporated by reference herein.

TECHNICAL FIELD

The present disclosure relates to a foreign object capturing device and a facility for manufacturing an electrical steel sheet including the same.

BACKGROUND ART

A directional electrical steel sheet having magnetic characteristics of low iron loss and high magnetic flux density is required to reduce loss of power and improve efficiency of an electrical device such as a transformer. To this end, there is a need for a process for manufacturing a magnetic domain refinement product of a directional electrical sheet, that is, a magnetic domain refinement process of reducing iron loss by forming grooves in the surface of a directional electrical steel sheet by applying a high-power continuous wave laser beam for forming grooves.

As an example of the magnetic domain refinement process of an electrical steel sheet, there has been proposed a technology of securing an improvement ratio of iron loss after heat treatment of a directional electrical steel sheet by forming grooves through vaporization of a substance by radiation of a pulse laser, etc.

However, such methods for permanent magnetic domain refinement are supposed to form grooves in the surface of a steel sheet, but various types of foreign objects such as particles chips, spatters, and fumes are produced on the surface of a steel sheet.

Such foreign objects should be removed immediately with production, and if they are not removed immediately with production, there is a problem that they contaminate surrounding facilities and make a surrounding work environment worse.

In particular, when an optical system that transmits a laser to a steel sheet is contaminated, the performance is rapidly deteriorated, so there is a problem that it is difficult to secure quality and productivity in machining of grooves.

Accordingly, it is required to capture such foreign objects to completely remove them. Further, a capture apparatus and method should be designed in consideration of the characteristics of spatters and fumes in order to capture and remove foreign objects such as spatters and fumes.

A spatter has a substantially spherical shape, has a diameter in the range of hundreds of nm to tens of nm, is composed of Fe, Si, C, and O, and contains magnetic foreign objects, so it is a matter to remove a spatter.

Further, there is a defect that it is difficult to detach and collect magnetic foreign objects after the magnetic foreign objects are attached to a magnetic member.

Accordingly, there is a need for a study of a foreign object capturing device that can improve the problems and limits described above, and a facility for manufacturing an electrical steel sheet including the foreign object capturing device.

DISCLOSURE

Technical Problem

An objective of the present disclosure is to provide a foreign object capturing device that can remove foreign objects, and a facility for manufacturing an electrical steel sheet including the foreign object capturing device.

Another objective of the present disclosure is to provide a foreign object capturing device that can easily detach magnetic foreign objects, which are attached by magnetism, when removing the foreign objects, and a facility for manufacturing an electrical steel sheet including the foreign object capturing device.

Technical Solution

A foreign object capturing device of the preset disclosure may include: a captured body unit having an inlet through which air containing magnetic foreign objects enters and an outlet through which air with magnetic foreign objects removed is discharged; and a magnetic separation unit including magnetic members, which are linked to the captured body unit and separate magnetic foreign objects from air flowing in the captured body unit using attraction, and having a nonmagnetic member surrounding the magnetic members.

In detail, the nonmagnetic member of the foreign object capturing device according to an embodiment of the present disclosure may include a nonmagnetic plate portion coupled to the captured body unit and made of a nonmagnetic material; and a reception pipe portion coupled to the nonmagnetic plate portion, provided as a plurality of pipe members to correspond to the magnetic members provided as a plurality of columns, and made of a nonmagnetic material.

In this configuration, the reception pipe portion of the foreign object capturing device according to an embodiment of the present disclosure may be disposed such that gaps of adjacent reception pipe portion are smaller than at least 30 mm.

Further, reception pipe portion of the foreign object capturing device according to an embodiment of the present disclosure may have an anti-drag tap formed to protrude formed circumferentially on an external surface of the reception pipe portion.

In this configuration, the anti-drag tap of the foreign object capturing device according to an embodiment of the present disclosure may be perpendicularly coupled to the reception pipe portion in a toroidal disc shape.

Further, the nonmagnetic member of the foreign object capturing device according to an embodiment of the present disclosure may be disposed such that gaps between reception pipe portion of a first line disposed at an upstream side in a direction of air flow are larger than gaps between reception pipe portion of a second line disposed at a downstream side in the direction of air flow.

Further, the magnetic separation unit of the foreign object capturing device according to an embodiment of the present disclosure may include a driving member coupled to the magnetic members and providing a driving force for inserting or removing the magnetic members into or out of the nonmagnetic member coupled to the captured body unit.

Further, the captured body unit of the foreign object capturing device according to an embodiment of the present disclosure may include: a connection pipe member that has the inlet and the outlet and to which the nonmagnetic member is coupled; and an under-box member coupled to a lower portion of the connection pipe member and receiving magnetic foreign objects dropping from the connection pipe member.

Further, the foreign object capturing device according to an embodiment of the present disclosure may include a shower unit disposed adjacent to the nonmagnetic member and spraying fluid to the nonmagnetic member.

In this configuration, the shower unit of the foreign object capturing device according to an embodiment may spray the fluid downward at an angle.

A facility for manufacturing an electrical steel sheet according to another embodiment of the present disclosure may include: a laser chamber into which an electrical steel sheet is fed; a laser device disposed in the laser chamber and forming grooves in a surface of the electrical steel sheet by radiating a laser; and the foreign object capturing device of any one of claims linked to a hood member, suctioning foreign objects scattered from the surface of the electrical steel sheet, and that receiving air containing magnetic foreign objects.

Advantageous Effects

The foreign object capturing device of the preset disclosure and the facility for manufacturing an electrical steel sheet including the foreign object capturing device have an effect of being able to remove foreign objects.

In another aspect, the foreign object capturing device of the preset disclosure and the facility for manufacturing an electrical steel sheet including the foreign object capturing device have an advantage that it is possible to easily detach magnetic foreign object attached by magnetism when removing foreign objects.

However, various and useful advantages and effects of the present disclosure are not limited to those described above and may be more easily understood in the process of describing detailed embodiments of the present disclosure.

BRIEF DESCRIPTION OF THE DRAWINGS

FIG. 1 is a configuration view showing a foreign object capturing device of the present disclosure.

FIG. 2 is a perspective view showing a magnetic separation unit of the foreign object capturing device of the present disclosure.

FIG. 3 is a plan view showing an embodiment in which the gaps of reception pipe portion of the magnetic separation unit have been adjusted in the foreign object capturing device of the present disclosure.

FIG. 4 is a front view showing an embodiment in which the foreign object capturing device of the present disclosure is equipped with a plurality of magnetic separation units disposed across an airflow direction.

FIG. 5 is a side view showing an embodiment in which an anti-drag tap is formed on a reception pipe of the magnetic separation unit of the foreign object capturing device of the present disclosure.

FIG. 6 is a side view showing an embodiment in which a shower unit sprays fluid downward at an angle in the foreign object capturing device of the present disclosure.

FIG. 7 is a configuration view showing a facility for manufacturing an electrical steel sheet.

BEST MODE

Hereinafter, exemplary embodiments of the present disclosure will be described in detail with reference to the accompanying drawings. However, such embodiments of the present disclosure may be modified in various ways and the scope of the present disclosure is not limited to the embodiments to be described below. Embodiments of the present disclosure are provided to more completely explain the present disclosure to those skilled in the art. The shapes and sizes of the components in the drawings may be exaggerated for more clear explanation.

Further, a singular expression includes a plural expression unless clearly stated otherwise in the contexts in the specification, and same or similar reference numerals indicate same or similar components throughout the specification.

The present disclosure relates to a foreign object capturing device 1 and a facility for manufacturing an electrical steel sheet including the foreign object capturing device 1, which an remove foreign objects, and in another respect, can easily detach magnetic foreign objects, which are attached by magnetism, when removing the foreign objects.

The present disclosure is described in detail with reference to drawings. FIG. 1 is a configuration view of the foreign object capturing device 1 of the present disclosure. Referring to the figure, the foreign object capturing device 1 includes: a captured body unit 100 having an inlet 111 through which air containing magnetic foreign objects enters and an outlet 112 through which air with magnetic foreign objects removed is discharged; and a magnetic separation unit 200 including magnetic members 210, which are linked to the captured body unit 100 and separate magnetic foreign objects from the air flowing in the captured body unit 100 using attraction, and including a nonmagnetic member 220 surrounding the magnetic members 210.

As described above, the foreign object capturing device 1 of the present disclosure can separate magnetic foreign objects by including the magnetic members 210 that separate magnetic foreign objects using magnetism in the magnetic separation unit 200. Further, magnetic foreign objects are not directly attached to the magnetic members 210 by the nonmagnetic member 220 surrounding the magnetic members 210, so it is possible to easily separate magnetic foreign objects.

The captured body unit 100 functions as the body of the apparatus including the magnetic separation unit 200, etc., and may have the inlet 111 and the outlet 112 to receive air containing magnetic foreign objects and discharge air with magnetic foreign objects removed through the magnetic separation unit 200 to the outside.

Further, a shower unit 300 to be described below may also be disposed at the captured body unit 100, whereby it is possible to more effectively detach magnetic foreign objects attached to the magnetic separation unit 200. This configuration will be described in detail below with reference to FIG. 6.

Further, the captured body unit 100 may include an under-box member 120 that collects magnetic foreign objects detached by the magnetic separation unit 200, whereby it is possible to more easily handle the separated magnetic foreign objects.

That is, the foreign object capturing device 1 according to an embodiment of the present disclosure may include a connection pipe member 110 that has the inlet 111 and the outlet 112 and to which the nonmagnetic member 220 is coupled, and an under-box member 120 coupled to the lower portion of the connection pipe member 110 and receiving magnetic foreign objects dropping from the connection pipe member 110.

In this configuration, the connection pipe member 110 functions as a passage through which air flows. That is, since the inlet 111 and the outlet 112 are formed at the connection pipe member 110, air flows.

Further, since the connection pipe member 110 is equipped with the magnetic separation unit 200, magnetic foreign objects are separated and removed from the air passing through the connection pipe member 110.

Further, the connection pipe member 110 may be equipped also the shower unit 300, whereby it is possible to more effectively detach magnetic foreign objects attached to the magnetic separation unit 200.

When magnetic foreign objects separated by the magnetic separation unit 200 are detached and dropped from the magnetic separation unit 200, the under-box member 120 collects the magnetic foreign objects.

To this end, the under-box member 120 may be coupled to the lower portion of the connection pipe member 110 equipped with the magnetic separation unit 200. Further, the under-box member 120 may communicate with the lower portion of the connection pipe member 110 to collect dropping magnetic foreign objects.

The magnetic separation unit 200 serves to separate and remove magnetic foreign objects from air containing the magnetic foreign objects. To this end, the magnetic separation unit 200 may include the magnetic members 210 linked to the captured body unit 100 and separating magnetic foreign objects using attraction, and the nonmagnetic member 220 surrounding the magnetic members 210 to prevent magnetic foreign objects from being directly attached to the magnetic members 210.

Magnetic foreign objects separated by the magnetic members 210 and attached to the external surface of the nonmagnetic member 220 by the magnetism of the magnetic members 210 can be detached while the magnetic members 210 come out of the nonmagnetic member 220, which will be described in detail below with reference to FIGS. 2 to 4.

FIG. 2 is a perspective view showing the magnetic separation unit 200 of the foreign object capturing device 1 of the present disclosure, FIG. 3 is a plan view showing an embodiment in which the gaps I of reception pipe portion 222 of the magnetic separation unit 200 have been adjusted in the foreign object capturing device 1 of the present disclosure, and FIG. 4 is a front view showing an embodiment in which the foreign object capturing device 1 of the present disclosure is equipped with a plurality of magnetic separation units 200 disposed across an airflow direction.

Referring to the figures, the nonmagnetic member 220 of the foreign object capturing device 1 according to an embodiment of the present disclosure may include a nonmagnetic plate portion 221 coupled to the captured body unit 100 and made of a nonmagnetic material, and reception pipe portion 222 coupled to the nonmagnetic plate portion 221, provided as a plurality of pipe members to correspond to the magnetic members 210 provided as a plurality of columns, and made of a nonmagnetic material.

As described above, since the nonmagnetic member 220 includes the nonmagnetic plate portion 221 and the reception pipe portion 222, magnetic foreign objects attached to the external surface of the nonmagnetic member 220 can be selected by the magnetism of the magnetic members 210 while the magnetic member 210 come out of the nonmagnetic member 220.

In other words, the reception pipe portion 222 may be provided in pipe member shapes and the magnetic members 210 may be provided in column shapes that can be inserted in the pipe member-shaped reception pipe portion 222.

The nonmagnetic plate portion 221 is coupled to the captured body unit 100 and has the reception pipe portion 222.

The reception pipe portion 222 are coupled to the captured body unit 100 through the nonmagnetic plate portion 221 or may be directly coupled to the captured body unit 100 without the nonmagnetic plate portion 221.

The magnetic members 210 are inserted into or separated out of the reception pipe portion 222. When the magnetic members 210 are inserted in the reception pipe portion 222, magnetic foreign objects are attached to the external surfaces of the reception pipe portion 222 by the attraction of the magnetic members 210 attracting the magnetic foreign objects, and then when the magnetic members 210 are separated out of the reception pipe portion 222, the magnetic foreign objects attached to the external surfaces of the reception pipe portion 222 are detached and dropped.

To this end, the reception pipe portion 222 have pipe member shapes corresponding to the columns of the magnetic members 210. Further, the magnetic members 210 may be connected to a driving member 230 to be described below to be inserted into or separated out of the reception pipe portion 222.

That is, the magnetic separation unit 200 of the foreign object capturing device 1 according to an embodiment of the present disclosure may include a driving member 230 coupled to the magnetic members 210 and providing a driving force for inserting or removing the magnetic members 210 into or out of the nonmagnetic member 220 coupled to the captured body unit 100.

In this configuration, the driving member 230 may be a stretchable hydraulic or pneumatic cylinder that stretches and contracts, or an electric motor.

The driving motor 230 configured in this way provides a driving force for moving the magnetic members 210, whereby the magnetic members 210 can be operated to be inserted into or separated out of the reception pipe portion 222.

For example, reception pipe portion 222 may be open at the top and closed at the bottom, and the magnetic members 210 may be connected to the driving member 230 that stretches and contracts so that the magnetic members 210 are moved down from the tops of the reception pipe portion 222 and inserted into the reception pipe portion 222 and are moved up and separated out of the reception pipe portion 222.

Further, the reception pipe portion 222 of the foreign object capturing device 1 according to an embodiment of the present disclosure may be characterized to be disposed such that gaps I of adjacent reception pipe portion 222 are smaller than at least 30 mm.

Limiting the gaps I of the plurality of reception pipe portion 222 in this way is for separating magnetic foreign objects from the air flowing between the reception pipe portion 222.

That is, if the gaps I between reception pipe portion 222 adjacent to each other is larger than 30 mm, the ratio of capturing magnetic foreign objects from air remarkably decreases, so the gaps I between the reception pipe portion 222 limited.

Further, the nonmagnetic member 220 of the foreign object capturing device 1 according to an embodiment of the present disclosure may be characterized in that the gaps between the reception pipe portion 222 of a first line L1 disposed at the upstream side in the airflow direction are larger than the gaps I between the reception pipe portion 222 of a second line L2 disposed at the downstream side in the airflow direction.

Since the reception pipe portion 222 are disposed in this way, it is possible to more effectively remove magnetic foreign objects in the air passing through the captured body unit 100.

That is, the reception pipe portion 222 of the first line L1 disposed at the upstream side in the airflow direction come into contact with air earlier than the reception pipe portion 222 of the second line L2 disposed at the downstream side in the airflow direction. Since the gaps I between the reception pipe portion 222 of the first line L1 are relatively wide, magnetic foreign objects are primarily separated while problems interfering with the flow of air are minimized. Further, the reception pipe portion 222 of the second line L2 that come into contact with air later than the reception pipe portion 222 of the first line L1 remove magnetic foreign objects with a larger contact ratio with air with magnetic foreign objects primarily removed, so they remove more magnetic foreign objects.

Further, according to this disposition, the reception pipe portion 222 of the second line L2 are disposed between the reception pipe portion 222 of the first line L1 across the airflow direction, so magnetic foreign objects are more effectively removed.

Further, the nonmagnetic member 220 of the foreign object capturing device 1 according to an embodiment of the present disclosure may be characterized by being provided as a plurality of parts across the airflow direction.

Accordingly, the magnetic member that is inserted in the nonmagnetic member 220 and the driving member 230 moving the magnetic member may also be provided as a plurality of parts.

Accordingly, it is possible to remove magnetic foreign objects only at a portion across the airflow direction, so it is possible to adjust the degree of capturing magnetic foreign objects.

FIG. 5 is a side view showing an embodiment in which an anti-drag tap 222a is formed on a reception pipe 222 of the magnetic separation unit 200 of the foreign object capturing device 1 of the present disclosure.

Since the reception pipe 222 has the anti-drag tap 222a, it is possible to prevent the problem that when the magnetic member 210 is separated out of the reception pipe 222, magnetic foreign objects attached to the external surface of the reception pipe 222 is also moved up.

In other words, the reason that magnetic foreign objects are attached to the external surface of the reception pipe 222 is the magnetism of the magnetic member 210, so there is a problem that when the magnetic member 210 is moved, magnetic foreign objects are also moved.

Since the anti-drag tap 222a protrudes from the external surface of the reception pipe 222, the anti-drag tap 222a functions as an obstacle when magnetic foreign objects are moved on the external surface of the reception pipe 222.

Accordingly, magnetic foreign objects are blocked and separated by the anti-drag tap 222a without moving along the magnetic member 210.

In more detail, the anti-drag tap 222a may have a disc shape with a hole at the center through which the reception pipe 222 can be disposed.

That is, the anti-drag tap 222a of the foreign object capturing device 1 according to an embodiment of the present disclosure may be characterized by being perpendicularly coupled to the reception pipe 222 in a toroidal disc shape.

Since the anti-drag tap 222a is perpendicularly coupled to the external surface of the reception pipe 222, magnetic foreign objects are further blocked by the anti-drag tap 222a, whereby it is possible to increase the ratio that magnetic foreign objects are detached without moving along the magnetic member 210.

FIG. 6 is a side view showing an embodiment in which a shower unit 300 sprays fluid downward at an angle in the foreign object capturing device 1 of the present disclosure. Referring to the figure, the foreign object capturing device 1 according to an embodiment may include a shower unit 300 disposed adjacent to the nonmagnetic member 220 and spraying fluid to the nonmagnetic member 220.

That is, the shower unit 300 to be described below may also be disposed at the captured body unit 100, whereby it is possible to more effectively separate magnetic foreign objects attached to the magnetic separation unit 200.

In other words, magnetic foreign objects can be attached to the nonmagnetic member 220 by the magnetic members 210, but may be attached by adhesive force to the external surface of the nonmagnetic member 220 even after the magnetic members 210 are separated out of the nonmagnetic member 220. Accordingly, the shower unit 300 detaches magnetic foreign objects attached as described above to the external surface of the nonmagnetic member 220.

To this end, the shower unit 300 can spray fluid toward the nonmagnetic member 220. The fluid, for example, may be gas such as air and may be liquid such as water.

In this configuration, the shower unit 300 of the foreign object capturing device 1 according to an embodiment of the present disclosure may be characterized by spraying fluid downward at an angle.

As described above, the direction in which the shower unit 300 sprays fluid is for more effectively collecting magnetic foreign objects when the under-box member 120 is provided at the lower portion of the captured body unit 100.

That is, the shower unit 300 sprays fluid downward at an angle to spray the fluid downward and toward the nonmagnetic member 220 such that the fluid hits against the nonmagnetic member 220.

FIG. 7 is a configuration view showing a facility for manufacturing an electrical steel sheet. Referring to the figure, a facility for manufacturing an electrical steel sheet according to another embodiment of the present disclosure may include a laser chamber 2 to which an electrical steel sheet S is fed, a laser device 3 disposed in the laser chamber 2 and forming grooves in the surface of the electrical steel sheet S by radiating a laser, and the foreign object capturing device 1 linked to a hood member 2a, suctioning foreign objects scattered from the surface of the electrical steel sheet S, and receiving air containing magnetic foreign objects.

As described above, the facility for manufacturing an electrical steel sheet S includes the laser device 3 to product a magnetic domain refinement product by forming grooves in a directional electrical steel sheet S, and includes the foreign object capturing device 1 described above that removes magnetic foreign objects of foreign objects such as spatters and fumes that are produced when grooves are formed by the laser device 3.

In this configuration, the laser device 3 and the hood member 2a that transmits air containing foreign objects to the foreign object capturing device 1 are disposed in the laser chamber 2. Further, the electrical steel sheet S is fed to the laser chamber 2.

The laser chamber 2 may have air curtains 2c at an inlet and an outlet for the electrical steel sheet S for sealing from the outside, and may have robbers 2b for supporting the electrical steel sheet S that is being moved.

The laser device is configured to radiate a laser to from grooves on the electrical steel sheet S. For example, the laser device 3 is composed of an on-off controller, a laser generator, and an optical system, and the on-off controller can turn on the generator under a normal work condition and can automatically turn off the generator in accordance with the amount of serpentine movement of the steel sheet.

Although embodiments of the present disclosure were described above, it would be apparent to those skilled in the art that the scope of the present disclosure is not limited thereto and the present disclosure may be changed and modified in various ways without departing from the spirit of the present disclosure described in claims.

The invention claimed is:

1. A foreign object capturing device comprising:
    a captured body unit having an inlet through which air containing magnetic foreign objects enters and an outlet through which air with magnetic foreign objects removed is discharged; and
    a magnetic separation unit including magnetic members, which are linked to the captured body unit and separate magnetic foreign objects from air flowing in the captured body unit using attraction, and having a nonmagnetic member surrounding the magnetic members,
    wherein the nonmagnetic member includes:
        a nonmagnetic plate portion coupled to the captured body unit and made of a nonmagnetic material; and
        a reception pipe portion coupled to the nonmagnetic plate portion, provided as a plurality of pipe members to correspond to the magnetic members provided as a plurality of columns, and made of a nonmagnetic material, and
    wherein the reception pipe portion have an anti-drag tap formed to protrude circumferentially on an external surface of the reception pipe portion.

2. The foreign object capturing device of claim 1, wherein the reception pipe portion are disposed such that gaps of adjacent reception pipe portion are smaller than at least 30 mm.

3. The foreign object capturing device of claim 1, wherein the anti-drag tap is perpendicularly coupled to the reception pipe portion in a toroidal disc shape.

4. The foreign object capturing device of claim 1, wherein the nonmagnetic member is disposed such that gaps between reception pipe portion of a first line disposed at an upstream side in a direction of air flow are larger than gaps between reception pipe portion of a second line disposed at a downstream side in the direction of air flow.

5. The foreign object capturing device of claim 1, wherein the magnetic separation unit includes a driving member coupled to the magnetic members and providing a driving force for inserting or removing the magnetic members into or out of the nonmagnetic member coupled to the captured body unit.

6. The foreign object capturing device of claim 1, wherein the captured body unit includes:
    a connection pipe member that has the inlet and the outlet and to which the nonmagnetic member is coupled; and
    an under-box member coupled to a lower portion of the connection pipe member and receiving magnetic foreign objects dropping from the connection pipe member.

7. The foreign object capturing device of claim 1, comprising a shower unit disposed adjacent to the nonmagnetic member and spraying fluid to the nonmagnetic member.

8. The foreign object capturing device of claim 7, wherein the shower unit sprays the fluid downward at an angle.

9. A facility for manufacturing an electrical steel sheet, the facility comprising:
    a laser chamber into which an electrical steel sheet is fed;
    a laser device disposed in the laser chamber and forming grooves in a surface of the electrical steel sheet by radiating a laser; and
    the foreign object capturing device of claim 1 that is linked to a hood member, suctioning foreign objects scattered from the surface of the electrical steel sheet, and that receives air containing magnetic foreign objects.

* * * * *